W. R. LUKENS AND C. F. GALLAGHER.
MECHANICAL STOCK FEEDER.
APPLICATION FILED OCT. 3, 1919.
1,383,222.
Patented June 28, 1921.
2 SHEETS—SHEET 1.
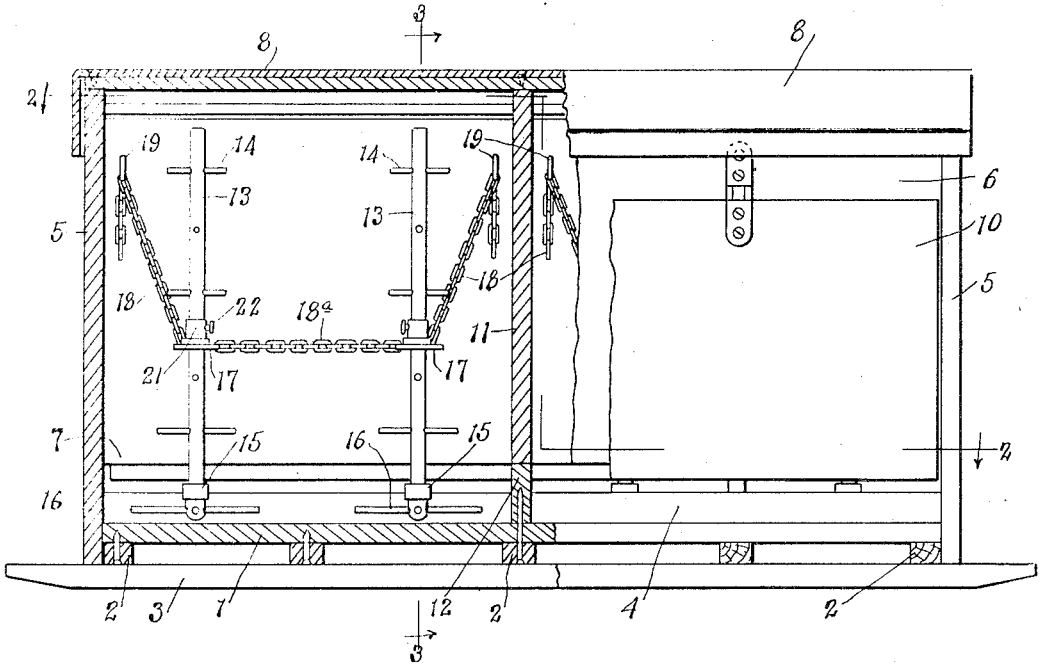
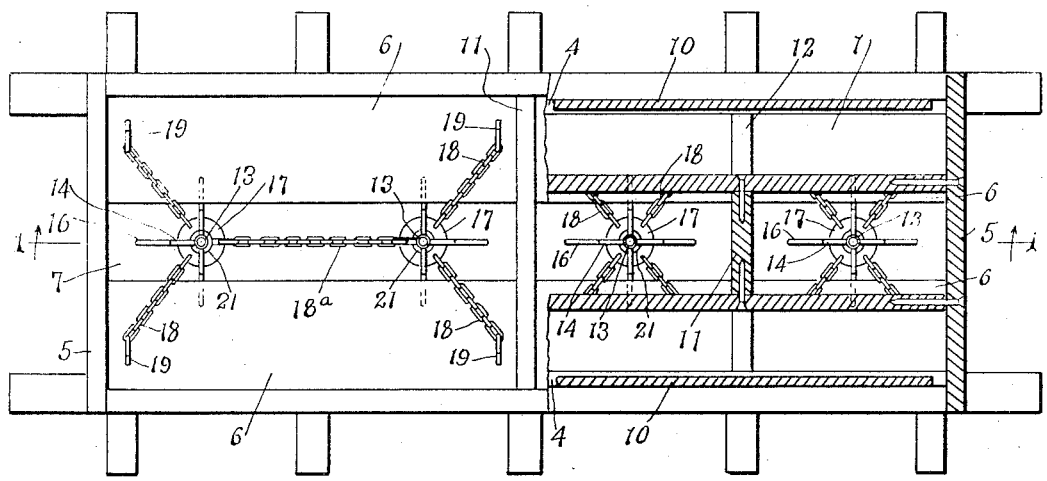
Inventors
W. R. Lukens,
C. F. Gallagher,
Toulmin & Toulmin
Attorneys

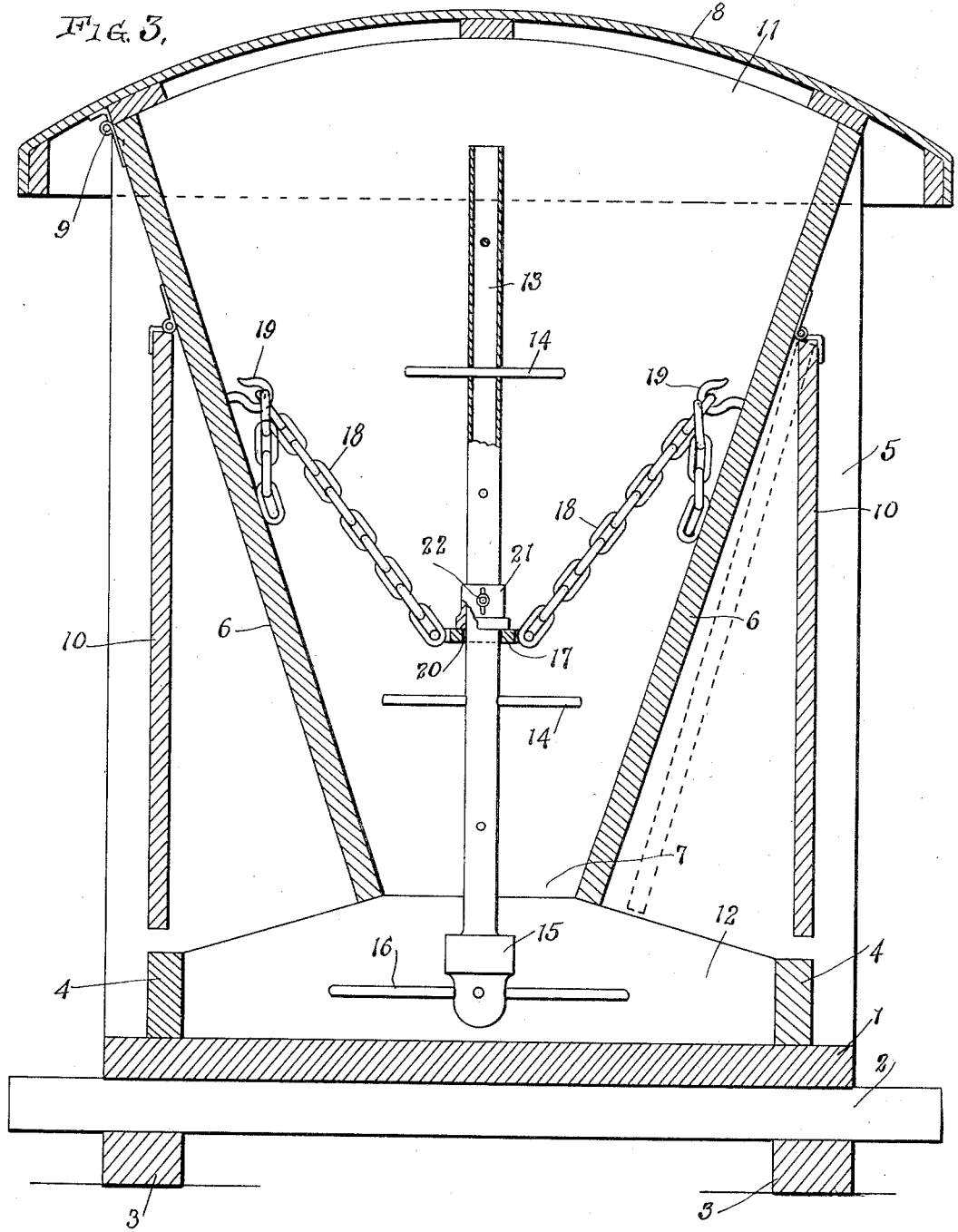

UNITED STATES PATENT OFFICE.

WILLIAM R. LUKENS AND CHARLES F. GALLAGHER, OF HILLSBORO, OHIO, ASSIGNORS OF ONE-FIFTH TO ALLEN T. PENCE, ONE-FIFTH TO A. B. SIMPSON, ONE-TENTH TO JOSEPH GAVEY, ONE-TENTH TO E. F. STEVENS, ONE-FIFTH TO WM. R. LUKENS, AND ONE-FIFTH TO ROBERT B. McMULLEN, ALL OF HILLSBORO, OHIO.

MECHANICAL STOCK-FEEDER.

1,383,222.　　　　　Specification of Letters Patent.　　Patented June 28, 1921.

Application filed October 3, 1919. Serial No. 328,200.

*To all whom it may concern:*

Be it known that we, WILLIAM R. LUKENS and CHARLES F. GALLAGHER, citizens of the United States, residing at Hillsboro, in the county of Highland and State of Ohio, have invented certain new and useful Improvements in Mechanical Stock-Feeders, of which the following is a specification, reference being had therein to the accompanying drawing.

This invention relates to mechanical stock feeders, being especially adaptable in the form here shown, to the feeding of hogs.

The present invention has various features of improved construction but relates especially to an improved feed agitator which is of novel construction and has a much wider range of movements than devices of this character heretofore used in mechanical feeders, the purpose of the invention being to provide in combination with a suitable hopper and feed trough, a feed agitator which when operated by the hogs feeding at the troughs will serve to agitate the feed in all portions of the hopper, thus preventing clogging thereof and causing the same to gravitate into the feed troughs.

With these and other objects in view the invention consists of the novel features of construction, and the combination and arrangement of parts as will be hereinafter fully described and claimed.

In the accompanying drawings forming a part of the specification and in which similar reference characters designate like parts throughout the several views, Figure 1 is a view partly in section and partly in side elevation of a stock feeder constructed in accordance with this invention, said view being taken substantially on the line 1—1 of Fig. 2;

Fig. 2 is a horizontal sectional view taken on the plane indicated by the line 2—2 of Fig. 1; and Fig. 3 is a transverse sectional view taken on the plane indicated by the line 3—3 of Fig. 1.

The stock feeder shown in the drawings above briefly described comprises a horizontal floor 1, to the lower side of which are fastened cross bars 2, and to these are fastened longitudinal bars 3 which serve as skids by means of which the feeder may readily be moved from place to place, so that the floor 1 is supported slightly above and out of contact with the surface upon which the feeder rests, the cross bars 2 extending beyond the longitudinal bars 3 on both sides of the feeder as shown in Figs. 2 and 3 to form guards between the feeding troughs. Rising from the floor 1 and extending longitudinally of the same along the side edges thereof are upright rails 4. These rails 4 in conjunction with the floor 1 form what may be termed a feed trough.

The numeral 5 designates the end walls of the feed hopper which are secured to the ends of the floor 1 and rise above the same. Disposed between the end walls 5 are side walls 6, the latter being inclined toward each other from their upper to their lower edges, said lower edges terminating at points above the plane passing through the upper edges of the rails 4 in order to provide a discharge 7 for the hopper. The roof or lid 8 of the hopper is hinged at 9 to one of the side walls thereof so that when it is raised access to the interior of the hopper may be obtained for filling the same, and the like. The side edges of the roof 8 extend a considerable distance beyond the edges of the feed trough to serve as a shelter for the troughs to prevent rain and snow being blown into the troughs. Further protection against this is obtained by doors 10 which are hinged at their upper edges to the side walls 6 in such a manner that the doors normally hang vertically in line with the side rails 4 but are capable of being pushed inwardly by the animals when feeding in order to gain access to the feed trough.

The hopper is divided into a number of compartments by means of vertical partitions 11 disposed transversely between the side walls 6 and secured in any suitable manner to the same. Partitions 12 resting on their edges upon the floor 1 and extending transversely between the side rails 4 divide the trough into compartments. If desired the partitions 11 and 12 may be made integral. By this arrangement a variety of feed may be supplied in the different hoppers at one time.

Disposed within each of the compartments is an agitator bar 13 which is preferably made up of a pipe section and provided with a number of cross bars 14 arranged alternately at right angles to one another. At the lower end of the bar 13 is secured a head 15, and this carries a number of radially extending arms or bars 16 disposed in the same plane substantially at right angles to each other.

Each of the agitator bars 13 is disposed within its respective feed compartment and has its lower end extending through the discharge aperture 7 into the feed trough. The means for mounting the agitator bars comprise plates 17 supported in a horizontal position within the compartments by chains 18 or other suitable means which in turn are connected to the side walls 6 by hooks 19. Each of the plates 17 is preferably suspended or supported by means of four chains 18, and these are arranged in planes disposed at suitable angles to each other. As shown in Fig. 2 cross chains 18ª may also be used to connect the feed agitators where two or more are used in the same hopper. The agitator bars 13 extend through openings 20 in the plates 17, downward vertical movement thereof with respect to the plates being prevented by means of sleeves or collars 21 which are secured to the agitator bars and prevented from sliding thereon by set screws 22.

As shown in Fig. 3 the openings 20 in the plates 17 are considerably larger in diameter than the agitator bars 13 so that both the upper and lower portions of the bars pivoting on the plates may rock back and forth thereon at any angle to their vertical centers without a great amount of movement of the plates. The sleeves or collars 21 are located at a point intermediate the ends of the bars 13, preferably a little below the centers of the same so that said bars swinging upon pivots intermediate of their ends will have a wide range of movements above and below their pivotal centers.

In use the feeder is placed upon the ground or wherever the stock is to be fed, and the feed is placed in the various compartments of the hopper, thus being disposed around the agitator bars and adapted to flow by gravity into the feed trough.

Stock learns instinctively to manipulate the mechanical feeders. Thus in feeding in order to gain access to the feed trough the animals will push inwardly on the doors 10 and will actuate the lower ends of the agitator bars 13 or the arms 16 carried by the same. The motion imparted to the agitator bars 13 by the stock in touching the same may be a rotary, oscillating, or reciprocal movement, or a combination of these. The bars being connected to the plates 17 in such a manner that they may swing back and forth in a wide range of movements, thus serve to agitate the meal in the entire hopper. The openings 20 in the plates 17 are large enough so that when the bars 13 only swing a slight amount the plates will not move, but when the bars swing a considerable bit they will engage the edge of the openings 20 and cause the plates 17 and the chains 18 to also rock, thus serving further to prevent the feed contained in the hopper from clogging and causing it to flow by gravity through the discharge 7 into the feed trough.

By having the agitator bars 13 pivoted intermediate their ends the feed loosened in the compartments and caused to flow into the trough will tend to flow into the side of the same from which the stock is pressing upon the agitator bars, as their upper ends will agitate the feed in this side of the hopper and the lower ends of the bars 13 will be disposed at the other side of the discharge.

Vertical adjustment of the agitator bars within the hopper is obtained by engaging the desired links of the chains 18 with the hooks 19, but a more accurate adjustment is obtained by locating the sleeves or collars 21 at the desired positions upon the bars which can be done by reason of said sleeves or collars being held in place upon the bars by means of the set screws 22.

From the foregoing description, taken in connection with the accompanying drawings, the construction, use and operation of our improved device will be readily understood.

Various changes in form, proportion, and in the minor details of construction may be resorted to without departing from the spirit of the invention as defined in the appended claims.

Having thus fully described our invention, what we claim as new and desire to secure by Letters Patent, is:—

1. In a mechanical feeder for stock, the combination with a hopper and a trough communicating therewith, of an agitator and a movable base therefor suspended to swing freely in the hopper in every direction, said agitator passing through said base and being capable of being reciprocated and rotated with respect thereto.

2. In a mechanical feeder for stock, the combination with a hopper and a trough communicating therewith, of an agitator and a movable base therefor, suspended to swing freely in every direction, said agitator being capable of movement relative to said base and adapted to agitate the feed above and below said base.

3. In a mechanical feeder for stock, the combination, with a combined feed hopper and trough, and a discharge aperture between said hopper and trough, whereby feed in the hopper may discharge to the trough, of a feed agitator mounted on a plate suspended from chains secured to the hopper, the feed agitator extending through said plate, having reciprocal movement on the opposite sides thereof and having its lower portion extending into the feed trough whereby the agitator may be actuated by the animals feeding at the trough to engage the feed in the hopper and cause the same to gravitate to the feed trough.

4. In a mechanical feeder for stock, the combination with a combined feed hopper and trough, and a discharge aperture between said hopper and trough, whereby feed in the hopper may discharge to the trough, of a feed agitator and a movable base therefor suspended to swing freely in every direction, said agitator extending through said base, having reciprocal movement on the opposite sides thereof and having its lower portion extending into the feed trough, whereby said agitator and the supporting base may be actuated by animals feeding at the trough to engage the feed in the hopper and cause the same to gravitate to the feed trough.

5. In a mechanical feeder for stock, the combination with a feed hopper and a plurality of feed troughs combined therewith, and a discharge aperture between the hopper and said troughs whereby feed from the hopper may discharge to each of said troughs, of a feed agitator rotatively and reciprocally suspended on a swinging plate suspended substantially in a central position horizontally and vertically with respect to the sides of the hopper in said hopper and having a portion extending into each of said troughs, whereby the agitator may be actuated by the animals feeding at the trough to engage the feed in the hopper and cause the same to gravitate to the feed trough.

6. In a mechanical feeder for stock, the combination, with a combined feed hopper and trough, and a discharge aperture between said hopper and trough, whereby feed in the hopper may discharge to the trough, of a plurality of feed agitators mounted upon plates suspended by chains secured in said hopper and joined one to the other by a chain interposed between the agitators, and having a portion extending into the feed trough, whereby said agitators and chains may be actuated by the animals feeding at the trough to agitate the feed in the hopper and cause the same to gravitate into the feed trough.

In testimony whereof we affix our signatures.

WILLIAM R. LUKENS.
CHARLES F. GALLAGHER.